P. Voorhis

Obstructing Ice in Rivers and Harbors.

No. 2,796. Reissued Nov. 5, 1867.

Witnesses
Charles Shew
John McGulpe

Inventor
Peter Voorhis
By atty J. A. McGulpe

N. PETERS, PHOTO-LITHOGRAPHER, WASHINGTON, D. C.

United States Patent Office.

PETER VOORHIS, OF NEW YORK, N. Y.

*Letters Patent No.* 63,968, *dated April* 16, 1867; *reissue No.* 2,796, *dated November* 5, 1867

METHOD OF OBSTRUCTING ICE IN RIVERS AND HARBORS.

The Schedule referred to in these Letters Patent and making part of the same.

TO ALL WHOM IT MAY CONCERN:

Be it known that I, PETER VOORHIS, of New York, of New York county, in the State of New York, have invented a new Method of Preventing the Choking up of Harbors, Ferry-Slips, etc., with Ice; and I do hereby declare that the following is a full and exact description thereof, reference being had to the accompanying drawings, making part of this application.

My invention relates to a novel method or means of preventing the choking up of and obstruction in harbors, etc., by the accumulation of floating ice, and has for its objects to prevent the floating of ice by the tides into harbors adjacent to and connected with rivers or streams in which the ice is made or formed; and also to prevent the accumulation of loose ice around ferry-slips, bridges, etc. And to these ends my invention consists in the employment of floating anchored ice-obstructors suitably constructed, and so arranged as to detain and hold bodies of floating ice, and induce an effectual stop or ice-dam, as will be hereinafter more fully explained.

To enable those skilled in the art to more fully comprehend my invention, I will proceed to describe it more in detail, referring to the accompanying drawings, in which—

Figure 2:
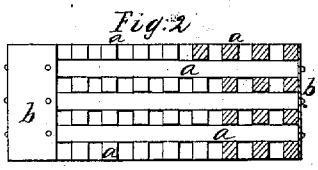
Figure 1:
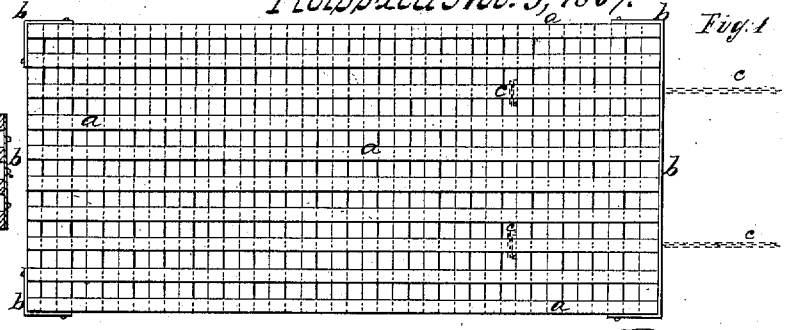
Figure 1:
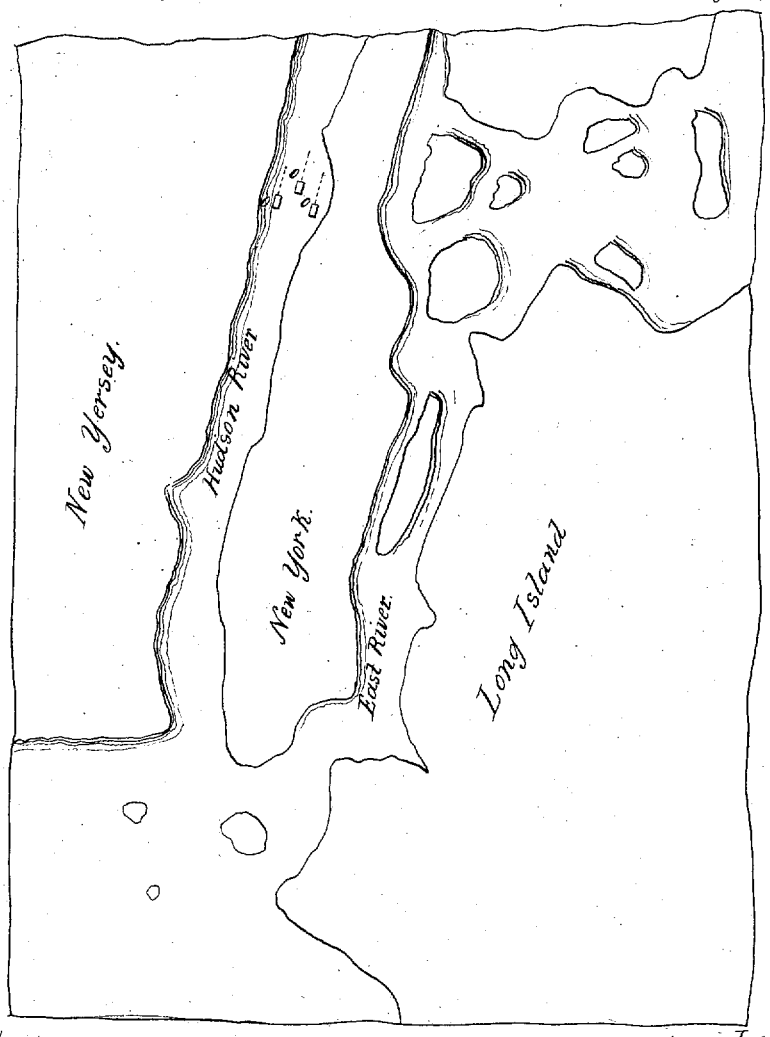

Figures 1 and 2 are a top view and a sectional elevation of an ice-obstructor, such as I propose to use.

Plate 2 is a diagram illustrating New York harbor, and the application thereto of my new method or system of ice obstruction.

The ice-obstructor or breaker I propose to make, as shown, in the form of a very strong and durable raft or framework of timbers clad with iron, as seen at figs. 1 and 2, plate 1, *a a* being the timbers, and *b b* the iron armor. These frames are to be floated to any desired place, and are to be provided with suitable chain cables, *c c*, to which are secured anchors sufficiently heavy to insure the permanency of the frame or raft against any pressure which may be brought against it. I will explain my new method as applied to the harbor of New York, illustrated at plate 2.

I have found by long observation, and from my experience in and knowledge of the tides and winds, that nearly if not quite all the ice which accumulates in the harbor of New York and chokes up the East river (causing, some seasons, by the interruption of ferries, damage to boats, wharves, etc., immense losses,) is made or formed up the Hudson river, and, after "breaking up" there, is carried by the tides down the Hudson and around into the harbor and to the East river, the difference between the times of the tides in these two rivers being such as to induce to this result. To avoid this great evil I propose to place in the Hudson river, say at about "Fort Washington" point, (or wherever the river is apt to freeze out pretty well,) a series of "ice-obstructors," as shown at *o o o*, plate 2, and there securely anchor them in such position as to form, together with the projections of the shores, such an impediment to bodies of ice that they will clog up at this point and effectually freeze or close over the river, and thus keep the lower portion of the river and the harbor entirely free of ice (until the ice shall have become so thin and rotten that its exit from the river can cause no damage or serious obstruction to navigation.) I also propose, wherever it may be expedient, to protect ferry-slips and wharves from being choked up and damaged by ice, by forming or effecting, at a proper locality near the slip or wharf, a blockade or dam of ice, clogging up the masses of ice with one or more of my ice-obstructors, as before explained. It will be understood that the frames or rafts described are readily to be removed or shifted from one place to another, as desired, and may be anchored wherever they may be needed. It will be seen that by the employment of a framework or raft such as shown and described, the ice-obstructor or breaker cannot be so damaged by the ice as to be rendered less effective, or have its usefulness impaired, as might be the case were a boat or vessel of any kind employed, the effectiveness of which could be destroyed by its becoming fractured or broken in.

I propose, under some circumstances, to make the ice-obstructor or breaker of such a form at that end or portion which is placed so as to catch the moving ice, that it will allow the cakes or bodies of ice to ride partially on to it, and effect the "breaking up" of the latter. Of course the details of construction of the frame or raft, its armor, the means of anchoring it, etc., may be varied at the will of the engineer, and to suit the circumstances under which my invention is to be carried out, the gist of my invention resting in the idea of the use of removable obstructors, so constructed and arranged at the proper locality as to effect the objects above alluded to. It will be understood that an obstructor, such as shown and described, will be exceedingly durable, and if (when not in use) it be floated off into fresh water during the warmer seasons, will last for a long time. It will be understood also that the forms and conditions of the armors or metallic plating may be varied to suit varying circumstances. I have deemed it essential to show and describe only one simple form of iron-clad raft.

Although I have shown and described the ice-obstructor as being formed of a crib-work, and clad with metallic armor, because I now deem such kind of obstructor best, I wish it to be distinctly understood that my invention may be carried out by the employment of differently-constructed ice-obstructors without losing its main advantages. For instance, boats or other floating vessels or bodies composed either of wood or metal, or both combined, may be used in lieu of the rafts shown, and such obstructing vessels or bodies, instead of being made to float, and being anchored, may be otherwise temporarily secured, the idea and object of my invention being to arrange in any suitable manner any sort of obstruction or obstructors at the proper locality to effect the clogging up or damming of the (river with the) ice in the manner and for the purposes hereinbefore explained, and in having such obstructors capable of ready removal when it is desired to reopen navigation.

Having explained the objects and operation of my new method and means of blockading ice to prevent obstruction in and damage to harbors, slips, bridges, wharves, etc., what I claim as new, and desire to secure by Letters Patent, is—

The employment of removable ice-obstructors, arranged to operate substantially as and for the purposes described.

In testimony whereof I have hereunto set my hand and seal.

PETER VOORHIS. [L. S.]

Witnesses:
CHAS. A. SCOTT,
WM. H. BISHOP.